Jan. 2, 1968  J. MASSONNE  3,361,532
PURIFICATION OF SULFUR HEXAFLUORIDE
Filed July 7, 1965

INVENTOR
Joachim Massonne

United States Patent Office 3,361,532
Patented Jan. 2, 1968

3,361,532
PURIFICATION OF SULFUR HEXAFLUORIDE
Joachim Massonne, Hannover, Germany, assignor to Kali-Chemie Aktiengesellschaft, Hannover, Germany
Filed July 7, 1965, Ser. No. 470,147
Claims priority, application Germany, July 7, 1964, K 53,405; Dec. 10, 1964, K 54,760
6 Claims. (Cl. 23—205)

ABSTRACT OF THE DISCLOSURE

Sulfuryl fluoride as impurity is removed from sulfur hexafluoride by contact with alumina or with an oxide, hydroxide or carbonate of the Ia or IIa group of the periodic system of elements.

Figure 1:
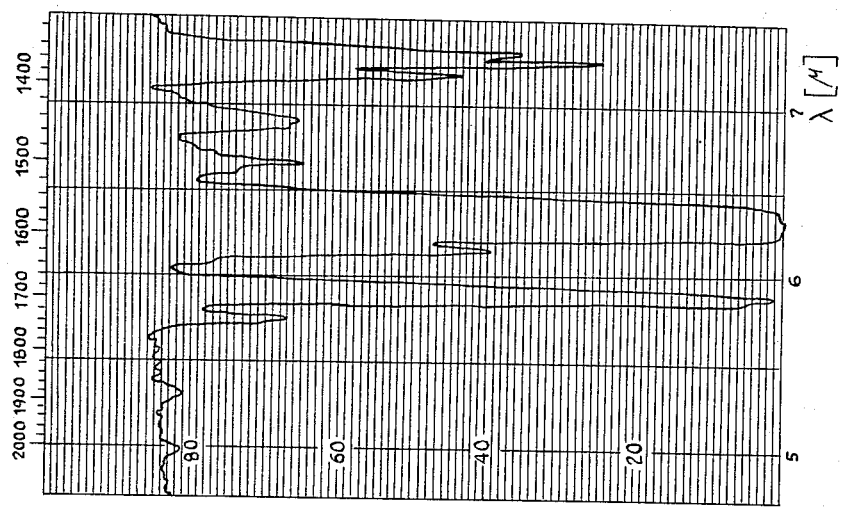

This invention relates to the removal of sulfuryl fluoride from gas mixtures containing sulfur hexafluoride as a major constituent and more particularly from commercial-grade sulfur hexafluoride.

Sulfur hexafluoride is commercially made from fluorine and sulfur. As the fluorine may contain oxygen, ozone, or oxygen difluoride, the obtained sulfur hexafluoride will contain, in addition to lower sulfur fluorides, a number of oxygen containing sulfur fluorine compounds, including sulfuryl fluoride in amounts of a few parts per million up to about 3%.

While, e.g., thionyl fluoride readily hydrolyzes and can be simply removed by washing crude sulfur hexafluoride with water or alkali metal hydroxide solutions, the removal of the sulfuryl fluoride is more difficult.

Sulfuryl fluoride is very resistant to hydrolysis and is hardly attacked by water. Therefore, even a steam treatment of the gas mixture at elevated temperatures is not successful. Physical separation methods such as distillation at low temperatures or under pressure, are not very efficient either, and they are too expensive.

Also washing with aqueous concentrated alkali metal hydroxide solutions, even at elevated temperatures, is not sufficiently effective to remove small amounts of impurities.

I have found that sulfuryl fluoride can be completely removed from gas mixtures containing sulfur hexafluoride by contacting said mixtures in the liquefied or gaseous state with alumina or with solid oxides, hydroxides, or carbonates of the Ia and IIa groups of the Periodic System, or mixtures thereof. Suitable compounds are, e.g., sodium hydroxide, potassium hydroxide, soda or potash lime, calcium oxide, magnesium oxide, basic magnesium carbonate, sodium aluminate, synthetic sodium aluminum silicates commercially available as molecular sieves, and others. When such materials are not available in powdery form but have been obtained from the molten state in glassy condition, I prefer to employ them applied to conventional carriers having a large surface. On the other hand, powdered substances may be used in the granulated form.

When purifying the sulfur hexafluoride in the gaseous state, reaction temperatures of 0–350° C., preferably between 20° and 180° C., shall be employed, whereas temperatures of —50° C. up to +45° C., preferably between 0° and 30° C., shall be employed when treating liquefied sulfur hexafluoride.

It is not necessary to dry the gas mixture before purification. But if the gas to be purified contains water vapor, I prefer to use elevated temperatures when the activator employed is hygroscopic so as to avoid deliquescence of the activator.

The sulfuryl fluoride reacts with said activators with formation of non-volatile compounds. At lower temperatures, the main reaction products are fluoro sulfonates and fluorides according to the reaction $$2NaOH+SO_2F_2 \rightarrow NaSO_3F+NaF+H_2O$$

At higher temperatures, e.g., at 200° C., the main reaction products are sulfates and fluorides according to the reaction $$2CaO+SO_2F_2 \rightarrow CaSO_4+CaF_2$$

This method of purification is very effective. Already a few parts per million of sulfuryl fluoride can be removed from the sulfur hexafluoride by reaction with the said active substances. Even when passing 100% sulfuryl fluoride through the said active substances, no sulfuryl fluoride can be detected after the reaction tube.

Figure 2:
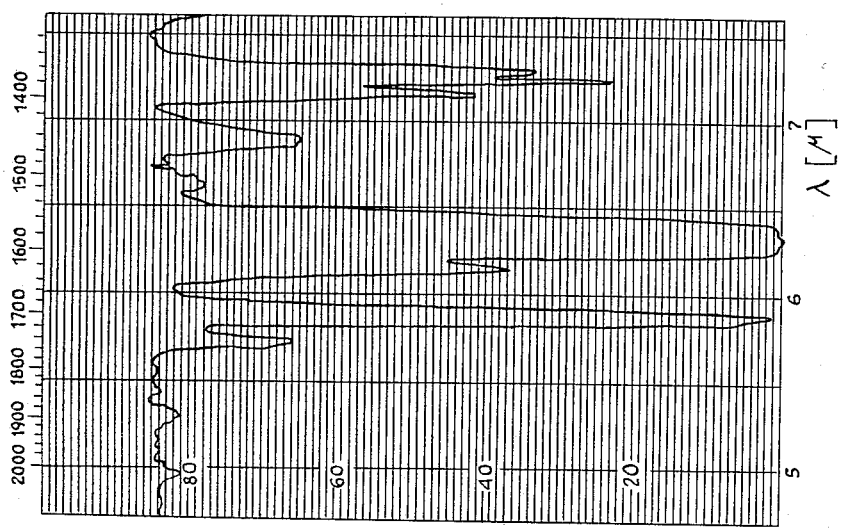

The effect of my purification method is illustrated by the accompanying drawings in which FIG. 1 shows the infra-red spectrum of sulfur hexafluoride prior to the purification, and FIG. 2 shows said spectrum after purification.

The spectra were taken in a 20 cm. gas cell at a pressure of about 760 mm. Hg.

On the abscissae, the wave lengths $\lambda$ are marked in $\mu$ while the corresponding frequencies in cm.$^{-1}$ are indicated at the top of the drawings. The transparency is marked on the ordinates.

$SO_2F_2$ has a band at 6.67$\mu$. It is distinctly shown in FIG. 1 while completely absent in the spectrum of the purified gas in FIG. 2.

For carrying out the purification according to the invention, gaseous sulfur hexafluoride is passed through the active material which may be preheated.

When treating liquefied $SF_6$, the reaction may be carried out in a pressure vessel, in the storage vessel or in a compressed gas steel cylinder. It is recommended to keep the activator in good distribution by agitating or shaking from time to time.

Instead of purifying the liquid sulfur hexafluoride batchwise it may also be passed through the active material in a continuous operation at temperatures from —50° to +45° C., preferably between 0° and 30° C.

The purified $SF_6$ is then ready for storage or shipment.

The method of purifying the sulfur hexafluoride in the liquid state has the advantage that the sulfur hexafluoride can be filled into the storage or shipping containers immediately after its production, a previous purification of the gas being not necessary.

The following examples illustrate more specifically the novel purification process whereby Example 1 is given to illustrate the unsatisfactory result obtained by a liquid treatment with alkali metal hydroxide solution while the other examples show the process of the invention. In all Examples 2 to 6, no residual sulfuryl fluoride was observed after purification.

EXAMPLE 1

Sulfur hexafluoride containing 0.1% by volume of sulfuryl fluoride was passed at room temperature at a rate of 12.5 liters/hour through a wash flask filled with 200 ml. of 40% KOH. The effluent gas contained 0.06% by volume of $SO_2F_2$.

Even when the potassium hydroxide was heated at 100° C., the effluent gas still contained 0.014% of $SO_2F_2$.

EXAMPLE 2

Sulfur hexafluoride containing 0.1% by volume of sulfuryl fluoride was saturated with water vapor at 20° C. and passed at a rate of 25 liter/hour over cylindrical packing material consisting of active alumina. The packing material was placed as a layer of 340 mm. length in a tube of 30 mm. diameter, which was heated at 150°

C. No sulfuryl fluoride could be detected in the purified gas.

The same result was obtained when the activated alumina was replaced by tablets which had been pressed from a mixture of 160 g. of activated alumina and 40 g. of basic magnesium carbonate or when the activated alumina was replaced by granulated soda-lime.

EXAMPLE 3

Granulated active carbon was impregnated with 40% sodium hydroxide and, after separation from the unadsorbed liquid, dried at 120° C.

A tube of 30 mm. diameter was filled with 150 g. of said impregnated active carbon, heated at 120° C. After sulfur hexafluoride containing 0.1% by volume of sulfuryl fluoride had passed this tube it contained no more sulfuryl fluoride.

EXAMPLE 4

Gaseous sulfur hexafluoride containing 0.1% by volume of sulfuryl fluoride was passed at room temperature at a rate of 25 liter/hour through a vertical tube having an inner diameter of 30 mm. and containing a layer of 340 mm. of granulated soda-lime. No sulfuryl fluoride could be detected in the gas leaving the tube.

EXAMPLE 5

Powdered magnesia was granulated with addition of water, and the grains were dried at 120° C. Particles of less than 1 mm. and more than 6 mm. diameter were screened off, and a vertical tube having an inner diameter of 30 mm. was filled to a height of 350 mm. with the grains and used for the purification of gaseous sulfur hexafluoride containing 0.1% by volume of sulfuryl fluoride. The gas was passed through the tube at room temperature at a rate of 25 liter/hour. No sulfuryl fluoride could be detected in the effluent gas.

EXAMPLE 6

A compressed gas steel cylinder of 10 liter volume was filled with 0.2 kg. of soda-lime and evacuated. Then, 10 kg. of liquefied $SF_6$ were introduced through a pressure line. The $SF_6$ contained, as shown by gas chromatographic analysis and the infra-red spectrum (FIG. 1), 0.02% of $SO_2F_2$. The steel cylinder was stored for 6 hours at 20° C. and was shaken each hour for a period of 5 minutes. A sample taken after 6 hours from the liquefied content of the cylinder showed that the $SO_2F_2$ had been completely removed (FIG. 2).

I claim:

1. A method of purifying sulfur hexafluoride containing sulfuryl fluoride as impurity comprising contacting said sulfur hexafluoride with a solid reactant selected from the group consisting of alumina, solid oxides, hydroxides, and carbonates of the Ia and IIa group of the periodic system, and mixtures thereof, thereby removing sulfuryl fluoride, and collecting the thus purified sulfur hexafluoride.

2. The method as claimed in claim 1 wherein gaseous sulfur hexafluoride is treated with said reactant at a temperature of about 0° to 350° C.

3. The method as claimed in claim 1 wherein liquefied sulfur hexafluoride is treated with said reactant at a temperature in the range of −50° to +45° C.

4. The method as claimed in claim 1 wherein liquefied sulfur hexafluoride is treated with said reactant at a temperature in the range of 0°–30° C.

5. The method as claimed in claim 1 wherein gaseous sulfur hexafluoride is treated with said reactant at a temperature of about 20° to 180° C.

6. The method as claimed in claim 5 wherein said treatment is carried out under elevated pressure.

References Cited

UNITED STATES PATENTS 2,462,379  2/1949  Gall _____ 23—205

OSCAR R. VERTIZ, Primary Examiner.

G. T. OZAKI, Assistant Examiner.